US008798315B2

(12) United States Patent
Van Dijk et al.

(10) Patent No.: US 8,798,315 B2
(45) Date of Patent: Aug. 5, 2014

(54) METHOD FOR DETECTING, IN PARTICULAR COUNTING, ANIMALS

(75) Inventors: Jeroen Martin Van Dijk, Enschede (NL); Bernard Jan Gerrit Schreurs, Bredevoort (NL); Vincent Hakvoort, Winterswijk (NL)

(73) Assignee: N.V. Nederlandsche Apparatenfabriek Nedap, Groenlo (NL)

( * ) Notice: Subject to any disclaimer, the term of this patent is extended or adjusted under 35 U.S.C. 154(b) by 0 days.

(21) Appl. No.: 13/146,855

(22) PCT Filed: Jan. 29, 2010

(86) PCT No.: PCT/NL2010/050042
§ 371 (c)(1),
(2), (4) Date: Oct. 11, 2011

(87) PCT Pub. No.: WO2010/087707
PCT Pub. Date: Aug. 5, 2010

(65) Prior Publication Data
US 2012/0020517 A1 Jan. 26, 2012

(30) Foreign Application Priority Data

Jan. 29, 2009 (NL) .................................... 2002462

(51) Int. Cl.
*G06K 9/00* (2006.01)
(52) U.S. Cl.
USPC .......................................... 382/103; 348/143
(58) Field of Classification Search
None
See application file for complete search history.

(56) References Cited

U.S. PATENT DOCUMENTS

| 5,574,762 | A  | * | 11/1996 | Sato et al. .................... 377/6 |
|-----------|----|---|---------|----------------------------------------|
| 6,856,696 | B1 | * | 2/2005  | Ajioka .......................... 382/173 |
| 7,346,187 | B2 | * | 3/2008  | Buehler ......................... 382/103 |
| 7,400,742 | B2 | * | 7/2008  | Popp ............................ 382/100 |
| 7,590,261 | B1 | * | 9/2009  | Mariano et al. ............... 382/103 |
| 7,903,141 | B1 | * | 3/2011  | Mariano et al. ............... 348/143 |
| 2008/0118106 | A1 | * | 5/2008 | Kilambi et al. ............... 382/103 |
| 2008/0137104 | A1 | * | 6/2008 | Lillerud et al. ............... 356/627 |
| 2013/0273968 | A1 | * | 10/2013 | Rhoads et al. .............. 455/556.1 |

FOREIGN PATENT DOCUMENTS

| EP | 0 700 017 | 3/1996 |
|----|-----------|--------|
| EP | 0 984 391 | 3/2000 |

OTHER PUBLICATIONS

Computer Vision Based People Tracking for Motivating Behavior in Public Spaces by Jacob A. Hyman; Aug. 22, 2003.*
L. Khoudour et al., "Real-time pedestrian counting by active linear cameras," Journal of Electronic Imaging, Oct. 1996, vol. 5, No. 4, pp. 452-459.
Hyman, Jacob A., "Computer Vision Based People Tracking for Motivating Behavior in Public Spaces," Thesis, M. Eng, Massachusetts Institute of Technology, Aug. 2003.
M. Tsuchikawa et al., "A Moving-Object Extraction Method Robust Against Illumination Level Changes for a Pedestrian Counting System," IEEE, 1995, pp. 563-568.

* cited by examiner

*Primary Examiner* — Nancy Bitar
(74) *Attorney, Agent, or Firm* — Jacobson Holman, PLLC.

(57) ABSTRACT

A method for detecting, in particular counting, animals that pass a predefined place in a walk-through direction with the aid of at least a camera, wherein the camera successively records pictures of the defined place and wherein the camera generates signals that represent these pictures and supplies these signals to signal processing means for further processing, wherein a multiplicity of the recorded pictures are processed with the aid of the signal processing means.

32 Claims, 7 Drawing Sheets

METHOD FOR DETECTING, IN PARTICULAR COUNTING, ANIMALS

This is a national stage of PCT/NL10/050,042 filed Jan. 29, 2010 and published in English, which claims the priority of The Netherlands number 2002462 filed Jan. 29, 2009, hereby incorporated by reference.

The invention relates to a method for detecting, in particular counting, animals that pass a predefined place in a walk-through direction with the aid of at least a camera, wherein the camera successively records pictures of the defined place and wherein the camera generates signals that represent these pictures and supplies these signals to signal processing means for further processing.

The invention further relates to a system provided with a camera and signal processing means for carrying out such a method.

Detecting and more particularly counting animals that pass a predefined place in a walk-through direction is known per se. In the known method, use is made of different kinds of sensors such as, for example, a camera. It is known, for example, to set up a light source on a first side of a walk-through path for the animals, while on the opposite side of the walk-through path a light-sensitive sensor is set up. By determining how often a light ray that is emitted by the light source to the sensor is interrupted, a number of animals can be counted. A disadvantage, however, is that no proper distinction can be made between animals that pass a defined place in the walk-through direction and animals that, after having passed this place, walk back again. In this kind of cases, it may happen that the animal walking back is still counted as an animal that is passing the predefined place in the walk-through direction. Other problems that occur are that two or more animals may walk so closely together that they are signaled as one animal passing in the walk-through direction. Also when use is made of a video camera with known signal processing means to determine how many animals have passed the predefined place in the walk-through direction, comparable problems occur.

The object of the invention is to provide an improved method for detecting, more particularly, for counting animals that pass a predefined place in the walk-through direction. The method according to the invention is characterized in that the picture lines of the successively obtained pictures include an angle different from zero degrees with the walk-through direction, wherein a multiplicity of the recorded pictures are processed with the aid of the signal processing means, as follows:

a. in a group of at least two successively obtained pictures, within these pictures at least one pattern is searched for that occurs in each of these pictures, and further at least one difference between the positions of a found pattern within the respective at least two successively obtained pictures of the group is determined if such a pattern is found and a difference between the positions of the pattern within the successively obtained pictures is present;

b. if in step a. within at least two pictures of the group the difference in the positions has been determined, from this difference a measure for the speed of the respective pattern in the walk-through direction is determined if the pattern moves in the walk-through direction and a measure for the speed of the respective pattern counter to the walk-through direction is determined if the pattern moves counter to the walk-through direction;

c. if the pattern moves in the walk-through direction, a number of picture lines from one of the pictures of the group are entered next to each other in a fictitious picture, wherein the number of picture lines that is entered in the fictitious picture is a function of the determined measure of the speed in the walk-through direction, wherein the picture lines that are entered in the fictitious picture are selected in a predetermined manner within the picture from which these picture lines originate, wherein the number of picture lines that is entered increases when the measure for the speed in the walk-through direction increases, and if the pattern moves counter to the walk-through direction, a number of picture lines last entered next to each other is removed from the fictitious picture, wherein the number of picture lines that is removed is a function of the measure of the speed counter to the walk-through direction, wherein the number of picture lines that is removed increases when the measure for the speed counter to the walk-through direction increases;

d. the fictitious picture is further built up by repetitively carrying out the steps a, b and c successively for consecutively obtained groups, wherein the picture lines that are entered in the fictitious picture are each time selected in the same predetermined manner within the picture from which these picture lines originate, wherein, each time for two consecutively obtained groups, it holds that a last recorded picture of a last obtained group of two consecutive groups was obtained later than a last recorded picture of the previously obtained group of two consecutively obtained groups;

e. in the fictitious picture that has been obtained after carrying out step d, the individual animals are detected and in particular the number of animals is counted.

As the fictitious picture is built up on the basis of picture lines that are each time selected in a same manner from a recorded picture and entered in the fictitious picture taking into account each time the instantaneous speed of the animal in the recorded picture, the fictitious picture gives a particularly accurate picture of each of the animals that have passed the defined place in the predetermined walk-through direction. Furthermore, the system is insensitive to animals that stand still or walk back.

A group can comprise, for example, three consecutively obtained pictures. The at least two successively obtained pictures of which the difference in positions within these pictures of the found pattern is determined, may be, for example, a first and a third picture within the group. Also, the at least two successively obtained pictures of which the difference in positions within these pictures of the found pattern is determined, may be, for example, a first and a second picture within the group. Also, in case a group comprises, for example, three consecutively obtained pictures, a first difference in position of the found pattern within the first and second picture may be determined, and a second difference in positions of the found pattern within the second and third picture may be determined, after which, for example, the two differences are added up to obtain the difference then corresponding to a total difference that occurs in the time lapse between the first and second picture. Also, the first difference and the second difference may be averaged to obtain the difference then corresponding to an average difference that occurs in an average time lapse between the first and second picture on the one hand and between the second and third picture on the other. Preferably, however, a group comprises a first picture and a second picture which have been successively obtained, wherein within the first and second picture at least one pattern is searched for that occurs in the first and second picture and also a difference is determined between the position of the found pattern within the first picture and the position of the found pattern within the second picture.

In particular, it holds that in step a. within the at least two pictures of the group, at least one pattern is searched for that occurs in each of the pictures and thereupon within each picture of the group a position of the found pattern is determined for determining the difference between the positions of the found pattern within the at least two successively obtained pictures, wherein only the positions of patterns are determined that correspond to each other and that take up different positions in different pictures. The thus found patterns will as a rule correspond to an animal that passes the predefined place. To have still more certainty that the patterns that are determined correspond to animals, it holds in particular that in step a. within the at least two pictures of the group at least one pattern is searched for that occurs in each of the pictures and thereupon within each picture of the group a position of the found pattern is determined for determining the difference between the positions of the found pattern within the at least two successively obtained pictures, wherein only patterns are searched for that correspond to at least one predetermined pattern that corresponds to a predetermined part of the animal. The accuracy of the method is thereby improved still further. According to a further elaboration thereof, it holds that in step a. in a group of at least two consecutive pictures, within each picture a position of a predetermined part of an animal is searched for and where possible determined; and that in step b., if in step a. within at least two pictures of the group the position of the predetermined part of the animal has been determined, from these positions a measure for the speed of the respective animal in the walk-through direction is determined if the animal moves in the walk-through direction and a measure for the speed of the respective animal counter to the walk-through direction is determined if the animal moves counter to the walk-through direction.

According to an alternative embodiment, it holds that in step a. in a first picture of the at least two pictures of the group, at a predetermined position within the first picture, a first partial picture is determined that consists of a part of the first picture, wherein thereupon in a second picture of the group a second partial picture is searched for that comprises a pattern that corresponds at least substantially to the pattern of the first partial picture and wherein thereupon the difference between the predetermined position of the first partial picture within the first picture and the position of the second partial picture within the second picture is determined to obtain the difference in positions. This has been found a highly reliable method of determining the difference in positions of the found pattern in the pictures of the group.

In particular, it holds that in step c an order in which the picture lines are entered in the fictitious picture corresponds to an order of these picture lines within the picture from which these picture lines originate. According to a possible further elaboration thereof, it holds that in carrying out step c. the picture lines that are entered in the fictitious picture are each time selected within the picture from which these picture lines originate in that the selected picture lines are a number of consecutive picture lines of which a first picture line each time lies at one and the same predetermined position within the picture from which it originates and of which the other lines within the picture from which they originate lie at a distance with respect to the first picture line in the walk-through direction. In this way, a fictitious picture is built up in which animals that have passed a predefined place are depicted in a row with an order in which they have passed this predefined place. The fictitious picture then shows, for example, a row of cows standing head-to-tail, a particularity being that the picture lines of the fictitious picture have all been obtained at the predefined place. More particularly, it holds here that the lines that in step c are entered in the fictitious picture are neighboring lines in the picture from which they originate, and these lines are also neighboring lines in the fictitious picture, with the order of the lines entered in the fictitious picture being the same as the order of these lines in the picture from which they originate. Owing to the picture lines being neighboring picture lines and not being formed, for example, only by the even or odd numbers of consecutively numbered picture lines, a very good imaging of the animals is obtained.

More particularly, it holds here that in step d the fictitious picture is further built up by repetitively carrying out the steps a, b and c successively for consecutively obtained groups, wherein the picture lines that are entered are each time so selected within the picture from which these picture lines originate that the selected picture lines are a number of consecutive picture lines of which a first picture line each time lies at one and the same predetermined position within the picture from which it originates and of which the other lines within the picture from which they originate lie at a distance from the first picture line in the walk-through direction. This in turn has as an advantage that the fictitious picture is built up on the basis of picture lines that are each time obtained at approximately a same position within the recorded picture because the first picture lines are each time obtained at a same position in recorded pictures. This means that the fictitious picture is built up on the basis of picture lines that each time relate to approximately a same position within the predefined place when a camera is set up at least substantially stationarily. The above-outlined exemplary embodiments each have as an advantage that in the fictitious picture the animals can be easily detected and hence can be easily counted as well.

According to an alternative elaboration of the invention, it holds that in step c if the pattern moves in the walk-through direction, in the fictitious picture a number of times one picture line from one of the pictures from the group are successively entered next to each other, wherein the picture line that is entered a number of times in the fictitious picture is a picture line with a predetermined position within the picture from which the picture line originates. As in this variant the fictitious picture is built up on the basis of picture lines that originate from each time an exactly the same position within the recorded pictures, and hence the fictitious picture is built up from picture lines that each time relate to an exactly the same position within the predefined place when the camera is stationary, the fictitious picture gives a particularly accurate picture of each of the animals that have passed the defined place in the predetermined walk-through direction.

According to a practical embodiment, it holds that the picture lines of the successively obtained pictures extend at least substantially transverse to the walk-through direction, more particularly, that these picture lines are directed at least substantially perpendicular to the walk-through direction.

In particular, it holds that the picture lines are directed at least substantially horizontally.

In particular, it holds that each group consists of two successively obtained pictures, wherein in step c each time the predetermined picture line from the first recorded picture from a group is entered in the fictitious picture. While per group only two pictures need to be analyzed, the method can be carried out relatively simply. In particular, it holds here that the predetermined picture line is a picture line that lies approximately in the center of the picture from which it originates.

According to a practical embodiment, it holds that, each time for two consecutive groups, it holds that a last picture of a first obtained group of the two consecutive groups is equal to a first obtained picture of the next group of the two consecutive groups. In this manner, optimum use is made of the recorded pictures. This is because each picture that comprises an animal one time forms a picture of a group that is used for obtaining a picture line that is entered in the fictitious picture.

In step e. the fictitious picture gives a picture of each of the animals that have passed the predefined place in the walk-through direction. These animals can be counted in a manner known per se with the aid of the signal processing means. It is also possible that on the basis of the length of the fictitious picture the number of animals is determined or estimated. This is because the length of the picture already gives a fair measure of the number of animals that have passed the predefined place, because the animals are depicted in a row head-to-tail and because every animal has approximately the same length.

Furthermore, it holds in particular that in step e. the foreground is separated from the background. A basic picture without animal can be subtracted from the picture, or anything that is stable in the picture can be omitted from the pictures. In the picture then resulting, the animals can be easily counted in a manner known per se.

In particular, it holds that in step e. prior to the counting of the animals in the fictitious picture from each line of the fictitious picture a line is subtracted that corresponds to a line that is obtained from a picture when in the picture no animal is present and which line has the predetermined position within the picture from which it has been obtained. In this manner, the fictitious picture is independent of the picture of the background of the predefined place. The picture is then, at least substantially, determined only by the animals that have passed the predefined place. After this, the animals can be counted in the fictitious picture in a manner known per se. It is further also possible that before counting, the pictures of the animals and the fictitious picture are provided with a uniform color. In particular, it holds that for counting the animals in the fictitious picture the number of paunches of the animals in the fictitious picture is counted.

The invention will presently be further elucidated on the basis of the drawings, in which:

FIG. 2b shows a second picture which has been obtained after the picture according to FIG. 2a of the group of pictures according to FIG. 2a;

Figure 1A:
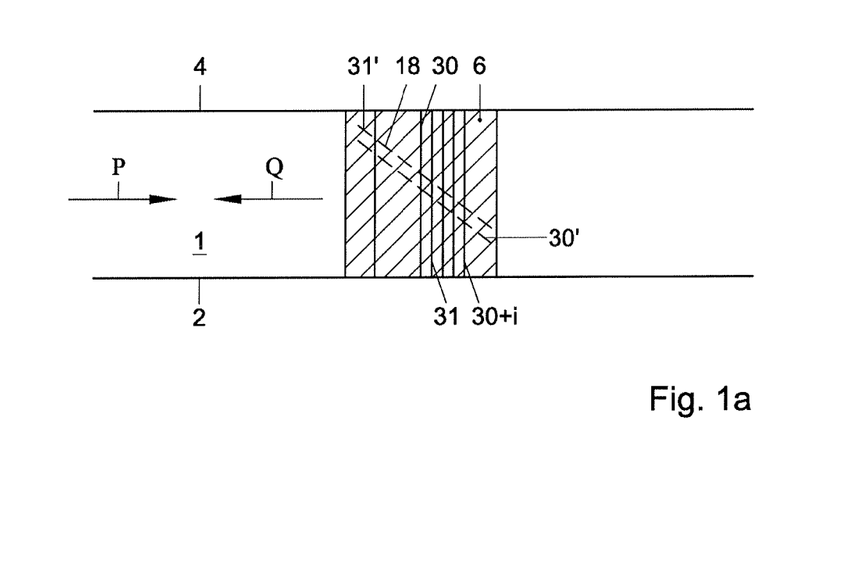
FIG. 1a shows a top plan view of a predefined place which the animals can pass in a walk-through direction P.
Figure 1B:
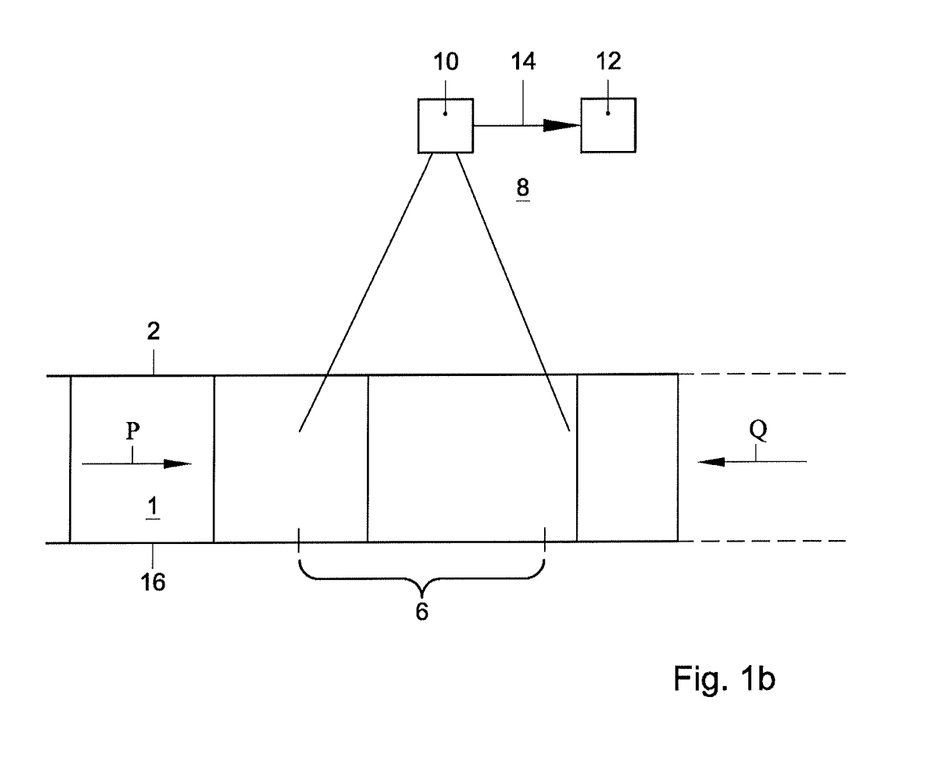
FIG. 1b shows a side elevation of the predefined place according to FIG. 1a, where in addition a system for carrying out the method is shown.

In FIG. 1a and FIG. 1b there is designated with reference numeral 1 a walk-through path for animals. The walk-through path is provided with two opposed fences 2 and 4 which bound the walk-through path. The fences extend parallel to a walk-through direction P for the animals. In the walk-through path, a predefined place 6 is represented in hatching. The intention is for animals that pass the predefined place 6 in the walk-through direction P to be counted.

For carrying out a method according to the invention, there is provided in this example a system 8 which comprises a camera 10 and signal processing means 12. The camera 10 is set up such that it can successively make pictures from a position above the predefined place 6 in the vertical direction downwards. The camera 10 may consist of a video camera known per se. This video camera known per se generates picture-representing signals which are supplied via a connection 14 to the signal processing means 12. In the example, the video camera is set up such that it records pictures of the predefined place 6. These pictures are each provided with picture lines which extend transverse, in this example perpendicular, to the walk-through direction P. In this example, these picture lines moreover extend parallel to a floor 16 of the walk-through path. The picture lines are thus directed substantially horizontally. In FIG. 1a one of the picture lines of the recorded picture is designated with reference numeral 18. In this example, it holds that a picture coincides with the predefined place 6.

Figure 2A:
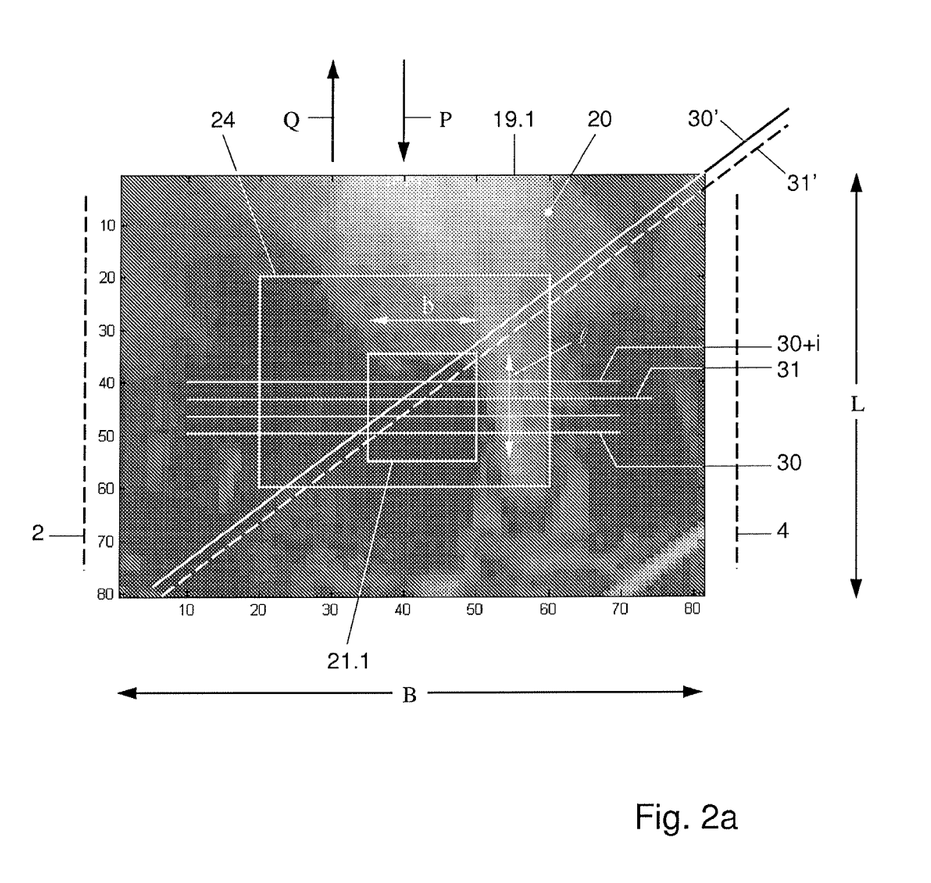
FIG. 2a shows a first picture of a group of at least two consecutive pictures.
Figure 2B:
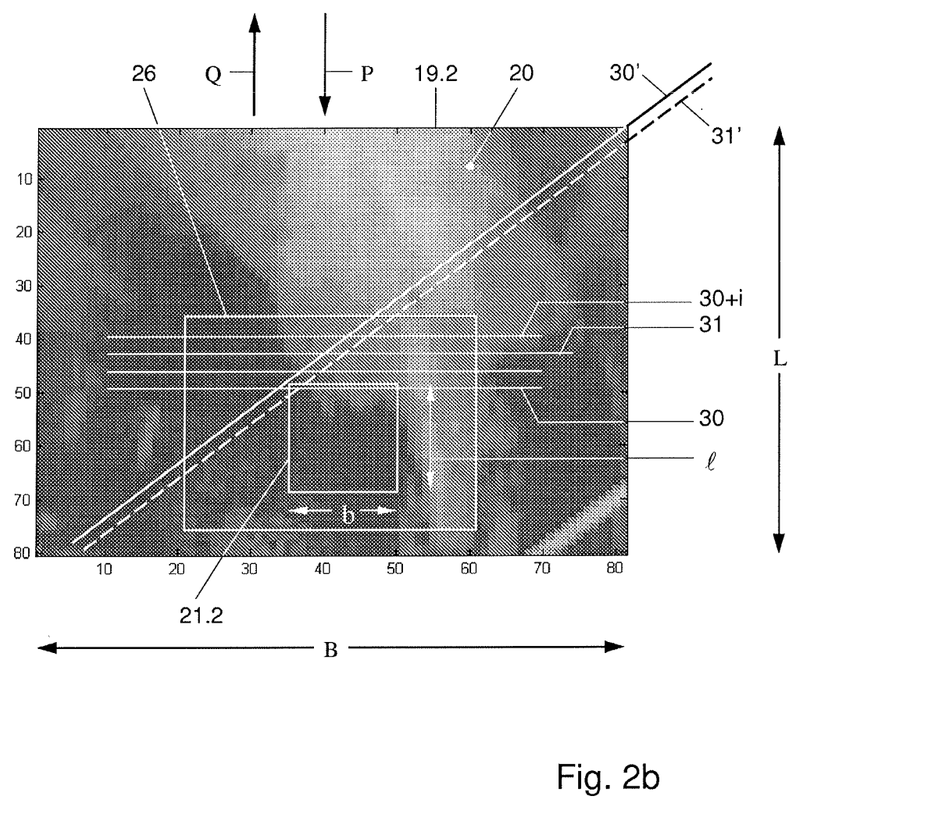

When the animals pass the predefined place in the direction of the arrow P, the video camera 10 is switched on. The video camera successively records pictures of the place 6 in a manner known per se. This may be done, for example, with a picture repetition frequency of 25 pictures per second. Each picture is provided with, for example, five hundred picture lines, of which one picture line is represented in the drawing with reference numeral 18. A multiplicity of the thus recorded pictures are processed with the aid of the signal processing means 12, as follows. The pictures that are supplied to the signal processing unit 12 are divided into groups. A group of pictures comprises at least two consecutively obtained pictures. In this example, a group contains two consecutive pictures. An example is given in FIG. 2a and FIG. 2b. FIG. 2a and FIG. 2b show two pictures 19.1 and 19.2, respectively, which have been consecutively recorded and which belong to one group. In each picture of the defined place, an animal 20 is recognizable which moves in the direction of the arrow P. In FIG. 2a, for clarity, the direction of the arrow P is represented once more. This shows that in FIG. 2a and FIG. 2b the direction of the picture has been rotated 90 degrees with respect to the picture recorded in FIG. 1a. For clarity, in FIG. 2a the fences 2 and 4 are schematically represented. Searching for at least one pattern that occurs in each of the pictures of the respective group may be carried out in different manners. Thus, it is possible that only the positions of patterns are determined that correspond to each other and that take up different positions in different pictures. In FIG. 2a and in FIG. 2b, in each picture a similar pattern is visible, which, however, is at different positions in the respective pictures. This pattern can then be selected. Then only the positions of patterns are determined that correspond to each other and that take up different positions in different pictures. In this example, the positions of the patterns then indeed correspond to the positions of an animal. As a position of a pattern, for example a center of gravity of the pattern may be determined. However, other possibilities are also conceivable.

For example, it is possible that in the first picture 19.1 of the group, at a predetermined position within the first picture, a first partial picture 21.1 is determined which consists of a part of the first picture (see FIG. 2a). Also the dimensions (l*b) of the first partial picture are predetermined and, in particular, much smaller than the dimensions (L*B) of the first picture. Thus, the surface of the predetermined partial picture 21.1 may be, for example, a factor 4, 9, 16, 25 and the like, smaller than the surface of the first picture 19.1. Thereupon, in the second picture 19.2 of the group, a second partial picture 21.2 is searched for that comprises a pattern that corresponds at least substantially to the pattern of the first partial picture 21.1. The dimensions (l*b) of the second partial picture are then preferably equal to the dimensions of the first partial picture. Searching for the second partial picture 21.2 within the second picture 19.2 can be carried out in a manner known per se with the aid of the signal processing means. A pattern may then be characterized by the place of the pixels of the pattern with respect to each other and possibly also by the color and/or intensity of the pixels. The position of the second partial picture within the second picture is determined. The difference between the position of the second partial picture within the second picture and the predetermined position within the first picture is a measure for the displacement and hence a measure for the speed of the animal. Position of a partial picture within a picture may be understood to mean the position of a center of gravity of the partial picture within the picture. In this example, it holds that the predetermined position of the first partial picture is approximately in the centre of the first picture.

It is, more particularly, possible that only patterns are searched for that correspond to at least one predetermined pattern that corresponds to a predetermined part of the animal, such as a head, neck and/or paunch of the animal. The signal processing means may be so arranged, for example, that they recognize in a picture a pattern that corresponds to a paunch or neck of an animal. If, for example in FIG. 2a but also in FIG. 2b, patterns have been recognized that correspond, these patterns in turn may be used for the determination of the location of the animal. The positions of an animal within the picture are then characterized by the position of a particular pattern.

More particularly, in the pictures of FIG. 2a and FIG. 2b, within each picture a position of a predetermined part of an animal may be searched for and, where possible, determined. Because the position of the pattern corresponds to the position of the animal, hereinafter reference will also be made to the position of the animal. Determining the position of the animal 20 in the picture of FIG. 2a and in the picture of FIG. 2b may be carried out in a manner known per se with the aid of image identification means.

In FIG. 2a an average position of the animal, or pattern, is designated through a rectangle 24. In FIG. 2b a position of the animal 20, or pattern, is designated likewise with the aid of a rectangle 26. It holds that, according to the invention, a pattern may be characterized by the locations of the pixels of the pattern with respect to each other and possibly also by the color and/or intensity of the pixels.

Based on the difference in positions of the animal within the pictures of a group (the difference between the position of partial picture 21.1 within the picture 19.1 and the position of partial picture 21.2 within the picture 19.2 or the difference between the position of the rectangle 24 within picture 19.1 and the position of rectangle 26 within picture 19.2, etc.), it is possible, when also the time lapse between the recording of the picture 19.1 and the picture 19.2 is known, to determine the speed of the animal in the walk-through direction. The speed may be expressed, for example, in a measure such as a number of decimeters per second. In this example, the speed of the animal in the walk-through direction P is determined, or the speed of the animal in a direction Q opposite to the walk-through direction P. Also, it is determined in which direction the animal moves, that is, in the direction P or the direction Q.

Figure 3A:
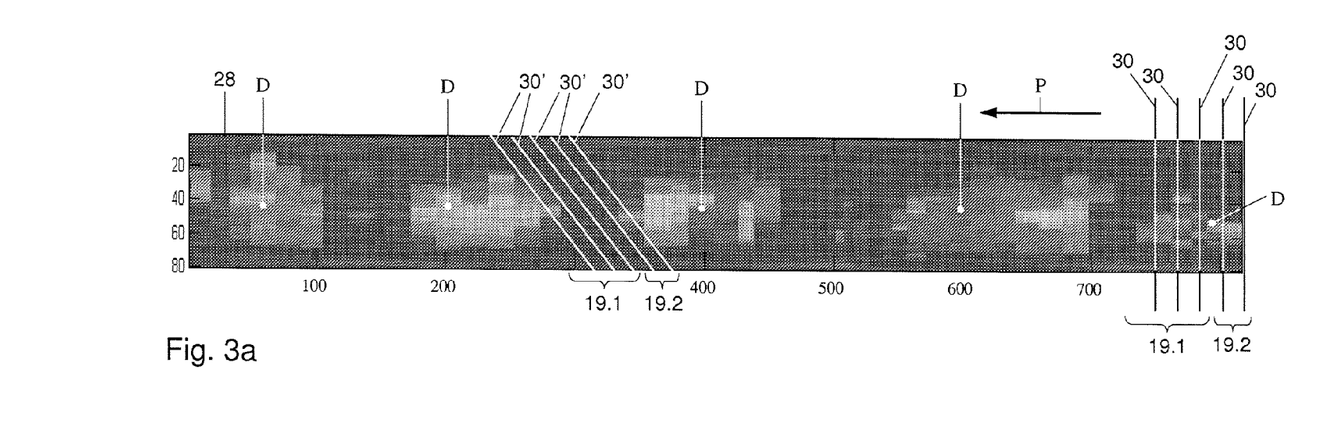
FIG. 3a shows a first embodiment of a fictitious picture obtained for a method according to the invention.

If the measure for the speed indicates that the animal is moving in a walk-through direction P, then in a fictitious picture 28 a number of times a same picture line 30 of one of the pictures from the group of two pictures are successively printed next to each other. In this example, this concerns a predetermined picture line 30 from the picture 19.1 of FIG. 2a. The picture line 30 in question has a predetermined position within the picture 19.1. In this example, this is approximately the center of the picture 19.1 in the walk-through direction P. The number of times that this same picture line 30 is entered is a function of the determined measure for the speed, where it holds that the number of times that the same line is entered increases when the measure for the speed increases. If the measure for the speed is, for example, one, the line 30 is entered only once in the fictitious picture 28, but when the measure for the speed is two, the respective line 30 is entered twice next to each other in the fictitious picture. In the example of FIG. 3a the line 30 is entered three times because the measure for the speed is three. One of the three lines 30 is designated with reference numeral 30. Entry of the lines in the fictitious picture of FIG. 3 is from left to right, viewed in time. Accordingly, viewed from left to right, the first three lines consist of the picture line 30 from the picture 19.1 of FIG. 2a. In the example, it holds further that a next group of pictures that is analyzed consists of the pictures 19.2 and 19.3. Entirely analogous to the manner described for the pictures 19.1 and 19.2, for the next group of pictures, i.e., the pictures 19.2 and 19.3, the position of the predetermined part of the animal within the pictures 19.2 and 19.3 is determined, while from these positions a measure for the speed of the respective animal in the walk-through direction is determined when the animal moves in the walk-through direction and a measure for the speed of the respective animal counter to the walk-through direction is determined if the animal moves counter to the walk-through direction. Further, it holds again that if the measure for the speed indicates that the animal is moving in the walk-through direction, in the fictitious picture of FIG. 3a thereupon a number of times a same picture line 30 of one of the pictures from the next group are successively entered next to each other. In this example, too, it concerns a picture line each time originating from the first picture of a group. The picture line is again the picture line that lies approximately in the center of the picture from which the picture line is obtained, viewed in the walk-through direction P. It also holds that the number of times that this picture line is entered is a function of the determined measure for the speed belonging to the respective group. Here too, it holds that the number of times that the same picture line is entered increases when the measure for the speed increases. This is carried out repetitively for consecutive groups of pictures 19.2 and 19.3, 19.3 and 19.4, 19.4 and 19.5, etc. If, however, it holds for a group, for example for the group of pictures consisting of the pictures 19.2 and 19.3, that the animal is moving counter to the walk-through direction, a number of lines last entered next to each other is removed from the fictitious picture. The number of lines that is removed is a function of the determined measure for the speed counter to the walk-through direction. It then holds, moreover, that the number of lines that is removed increases when the measure for the speed counter to the walk-through direction increases. If, for example, it appeared that the measure for the speed is one for the group of pictures consisting of the pictures 19.2 and 19.3, while moreover this speed is directed counter to the walk-through direction, a last entered line of FIG. 3a would be deleted. If the measure is one, this would mean, for example, that because the last lines entered are the three picture lines 30 from the picture 19.1 of FIG. 2a, the last line thereof is deleted. If the measure for the speed that is determined for the group of pictures 19.2 and 19.3 were two, then the two last lines entered would be deleted from the fictitious picture 28. This would then be the last two entered picture lines 30 that stem from the picture 19.1 of FIG. 2*a*.

As discussed above, the fictitious picture is expanded or shortened again by each time carrying out the respective steps repetitively for the consecutively obtained groups 19.1 and 19.2, 19.2 and 19.3, 19.3 and 19.4, etc. In this way, the picture lines that are entered in the fictitious picture each time have a same predetermined position within the recorded pictures from which these picture lines originate. In this example, it concerns each time the picture line 30 which is in the center of the respective picture viewed in the walk-through direction P. Further, it holds that each time for two successively obtained groups it holds that a last recorded picture of a last obtained group of two consecutive groups was obtained later than a last recorded picture of the previously obtained group of two successively obtained groups.

In this example it holds, as mentioned, that every group consists of two successively obtained pictures where, if a picture from a group is entered in the fictitious picture of FIG. 3*a*, this is each time a picture line from the first recorded picture from a group of pictures. Furthermore, it holds in the example that, each time for two consecutively obtained groups, it holds that a last picture of a first obtained group is equal to a first obtained picture of the next group. Stated differently, a first group consists, for example, of the pictures 19.1 and 19.2, a second group of pictures consists of the pictures 19.2 and 19.3, a third group of pictures consists of pictures 19.3 and 19.4, etc. Other divisions of groups, however, are also possible.

Based on the fictitious picture of FIG. 3*a*, it is already possible, on the basis of the length of the total picture in the direction P, to make an estimate of the number of animals that have passed the predefined place. A starting point here is that every animal has approximately the same length. The manner in which the fictitious picture has been generated moreover provides that head and tail of the animals adjoin.

Figure 4:
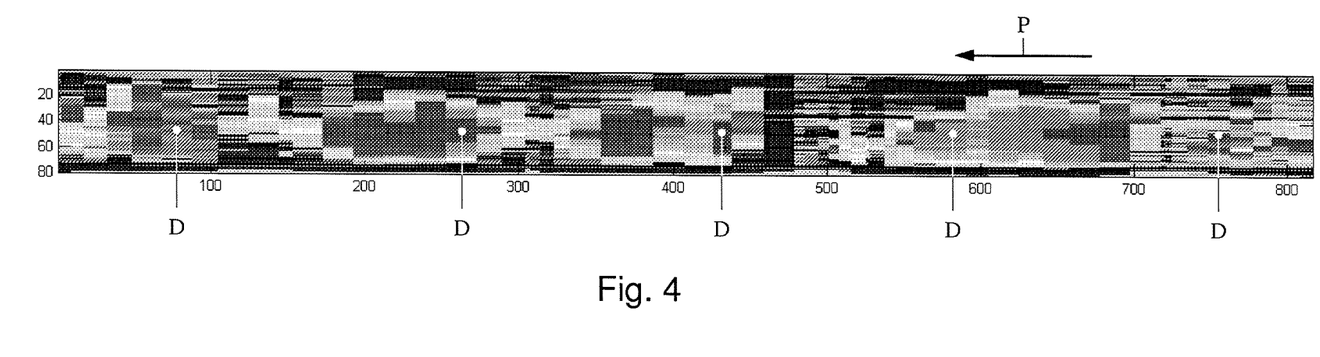
FIG. 4 shows a third embodiment of a fictitious picture obtained according to a method of the invention.
Figure 5:
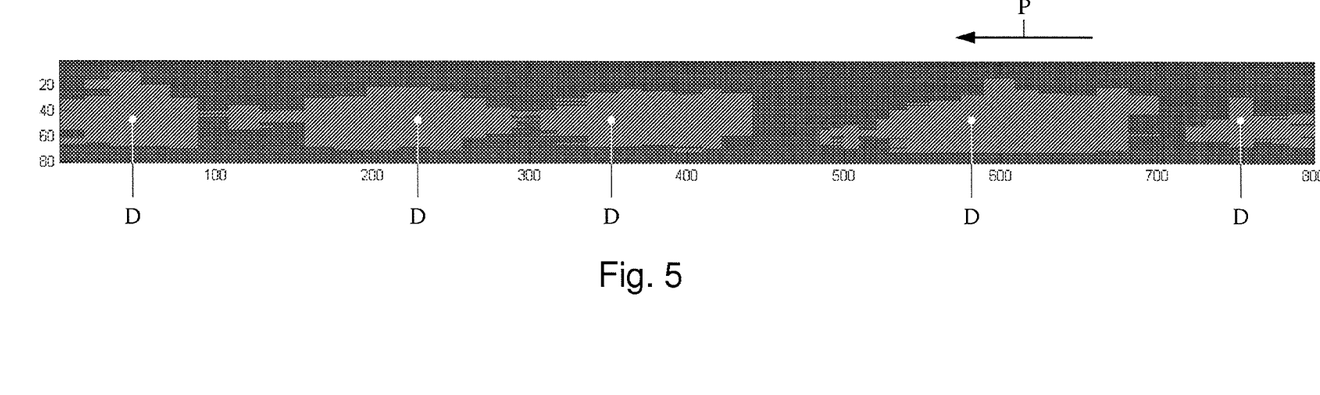
FIG. 5 shows a fourth embodiment of a fictitious picture obtained according to a method according to the invention.

It is also possible, however, that with the aid of image identification in the fictitious picture the number of animals that are visible are detected and then possibly counted. This can already be done on the basis of the information as shown in FIG. 3*a*. It is further also conceivable, however, that from every line of the fictitious picture of FIG. 3*a* a line is subtracted that corresponds to the predetermined line 30 that is entered within a picture when no animal is present in the picture. Such a line should in each case give the same line for any picture. In this way, the background of a picture in which an animal is present is, as it were, filtered out. The result of this is visible in FIG. 4. Based on the picture of FIG. 4, in a manner known per se the number of animals can be counted in a more accurate manner. It is further also possible, however, that on the basis of FIG. 4 the picture according to FIG. 5 is obtained. This is done by filling the bodies of the animals shown with a, for example uniform, color.

Figure 6:
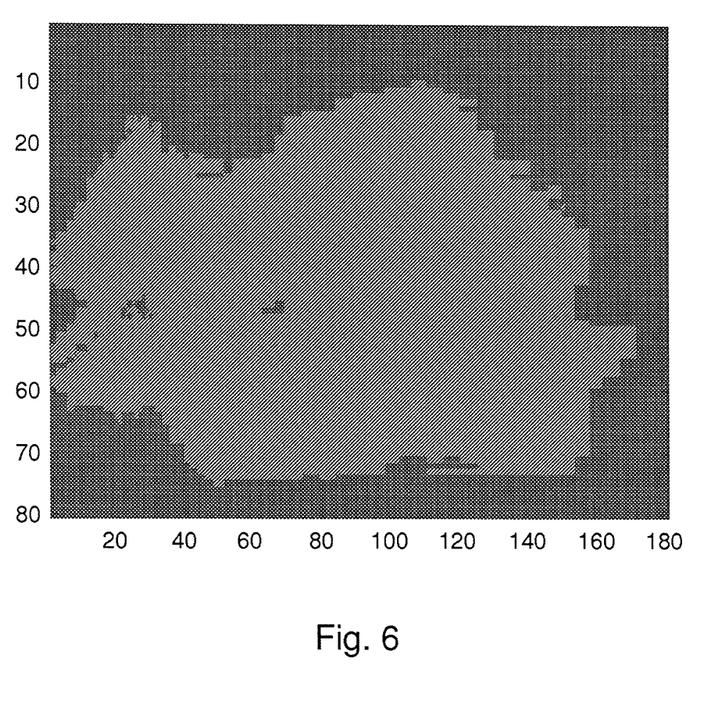
FIG. 6 shows the picture of an animal paunch.
Figure 7:
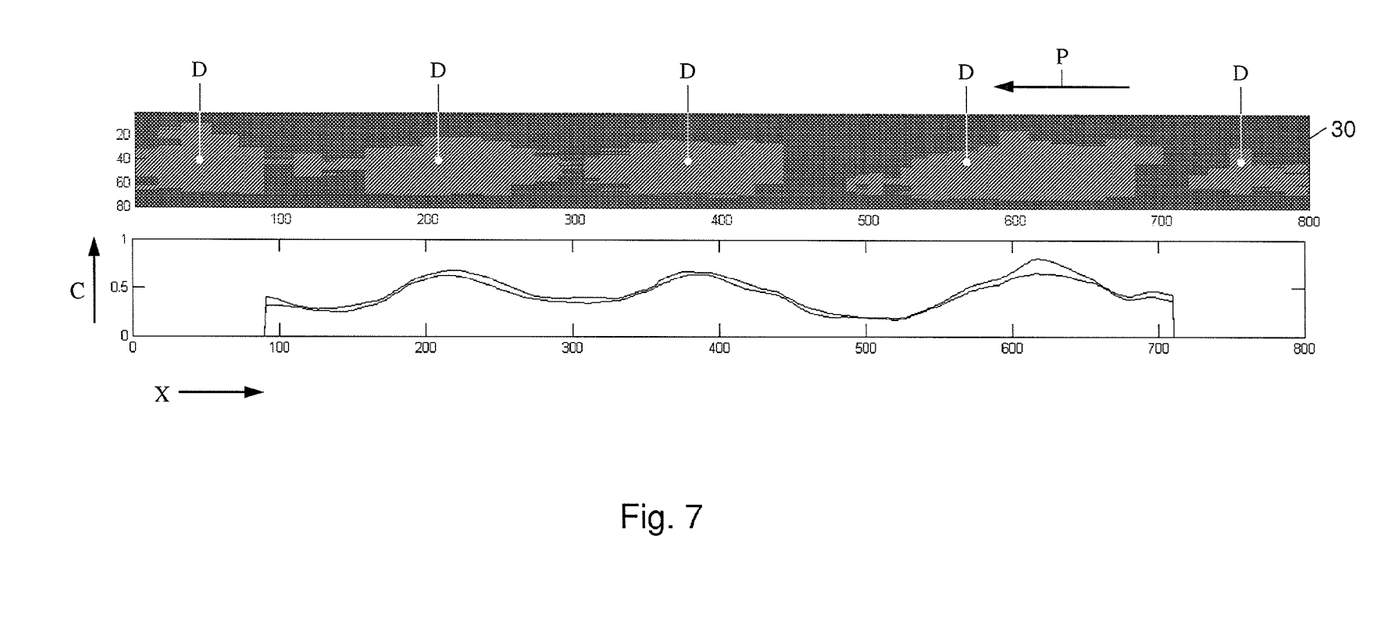
FIG. 7 shows the picture of FIG. 5 having added thereto an amplitude of correlation factors that has been obtained on the basis of the picture of FIG. 6.

Now, the heads of animals are generally difficulty detectable. This is partly due to the circumstance that they may be above or under another cow. By disregarding the heads and only counting the paunches of the cows, this problem can easily be circumvented. FIG. 6 shows an example of the paunch of a cow. Counting the paunches may be carried out, for example, as follows. By proceeding to correlate FIG. 6 with FIG. 5, the locations of the paunches of the animal in the fictitious picture are found. The correlation factors C are shown in FIG. 7 as a function of a position in the fictitious picture in the direction of the arrow P of the fictitious picture. This correlation in fact contains the function of the probability of a paunch. The higher the correlation factor, the higher the probability of a paunch. The number of animals can now be counted by counting the number of tops that become visible in the line that reflects the magnitude of the correlation factor C depending on the position X in the fictitious picture 28. For detecting the animals, more particularly counting them, also patterns repeated in the fictitious picture may be counted, which then have a relation with the number of objects.

Figure 3B:
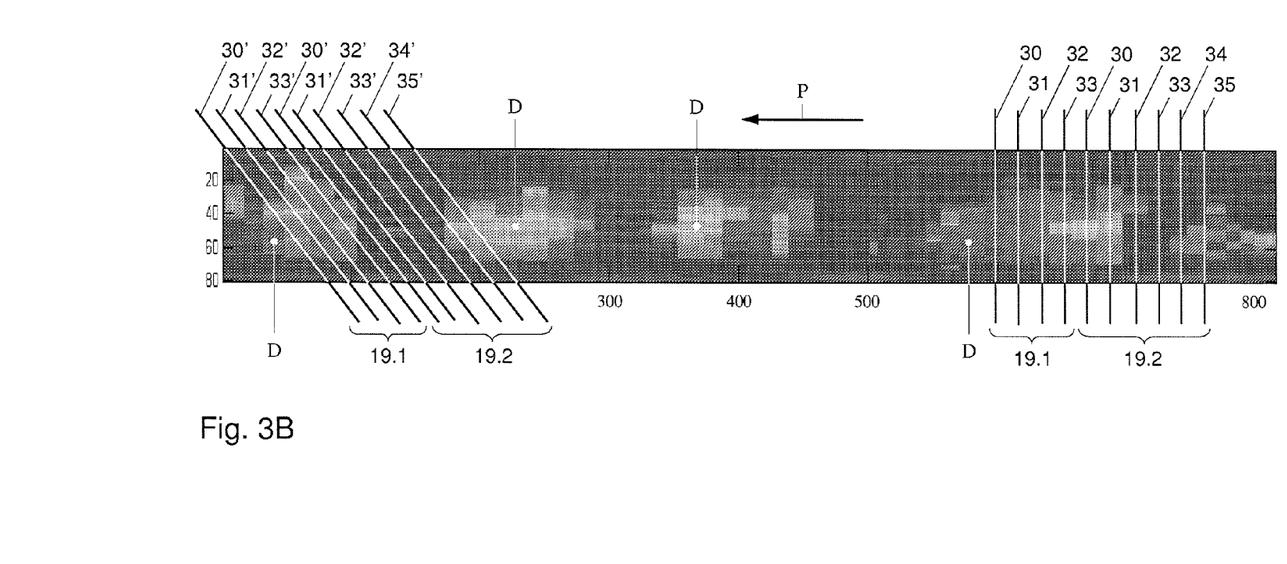
FIG. 3b shows a second embodiment of a fictitious picture obtained by a method according to the invention.

Obtaining the fictitious picture of which an example is shown in FIG. 3*a* may also be carried out in a different manner. Starting point for this is that in FIG. 2*a* and in FIG. 2*b* an average position of the animal, or pattern, or difference in positions is determined in one of the manners as discussed above. Also, the speed of the pattern, or the animal, in the walk-through direction P is then determined or the speed of the pattern, or the animal, in a direction Q opposite to the walk-through direction P is determined as discussed above. It is also determined in which direction the pattern, or the animal, is moving, i.e., in the direction P or in the direction Q. If the measure for the speed indicates that the animal is moving in a walk-through direction P, in an alternative fictitious picture 28 according to FIG. 3*b*, a number of consecutive picture lines 30, 31, 32, ... 30+i from the picture 19.1 are entered, of which a first picture line 30 each time lies in one and the same predefined place within the picture from which it originates and of which the other picture lines 31, 32, 33, ... 30+i lie within the picture from which they originate and in the walk-through direction P lie at a distance with respect to the first picture line 30. The number of picture lines I that are entered depends on the measure of the speed. In this example, it concerns the picture lines 30-35 from the picture 19.1 of FIG. 2*a*. In the example, it concerns the predetermined picture line 30 from the picture 19.1 of FIG. 2*a*. This picture line 30 has a predetermined position within the picture 19.*a*. In this example, this is approximately the center of the picture 19.1 in the respective walk-through direction P. The number of picture lines 30-30+i that are entered is a function of the determined measure of the speed, where it holds that the number of picture lines I that are entered increases when the measure for the speed increases. If the measure for the speed is, for example, one, only the picture line 30 is entered in the fictitious picture 28. When, however, the measure for the speed is, for example, two, the picture lines 30 and 31 are entered next to each other in the fictitious picture. In the example of FIG. 3*b*, four lines 30-34 are entered from the picture 19.1 because the measure of the speed belonging to the picture 19.1 in this example is five. The entry of the lines in the fictitious picture of FIG. 3*b* is, viewed in time, again from left to right. Accordingly, viewed from left to right, the first five lines consist of the picture lines 30-34 from the picture 19.1 of FIG. 2*a*. In this example, it holds, further, that a next group of pictures that is analyzed consists of the pictures 19.2 and 19.3. Entirely analogously to the manner described for the pictures 19.1 and 19.2, for the next group of pictures, i.e., the pictures 19.2 and 19.3, the positions of the animal, or the pattern, within the pictures 19.2 and 19.3 are determined, while from these positions a measure for the speed of the respective animal, or the pattern, in the walk-through direction is determined when the animal, or the pattern, is moving in the walk-through direction, and a measure for the speed of the respective animal, or pattern, counter to the walk-through direction is determined if the animal, or the pattern, is moving counter to the walk-through direction. Further, it holds again that if the measure for the speed indicates that the animal, or the pattern, moves in a walk-through direction, in the fictitious picture of FIG. 3*b* thereupon a number of picture lines 30-30*i* of one of the pictures from the next group are entered in succession next to each other. In this example, too, it concerns picture lines here that each time originate from the first picture of a group. The predetermined picture line is again the picture line that lies approximately in the center of the picture from which the picture line is obtained, viewed in the walk-through direction P. Also, it holds that the number of consecutive picture lines that are entered is a function of the determined measure of the speed belonging to the respective group. Here too, it holds that the number of times that the number of picture lines are entered increases when the measure for the speed increases. This is repetitively carried out for consecutive groups of pictures 19.2 and 19.3, 19.3 and 19.4, 19.4 and 19.5, etc. For example, for the group with pictures 19.2 and 19.3 it is determined that the measure for the speed of the animal is six. This has presently as a consequence that the picture lines 30-35 of the picture 19.2 belonging to the group of pictures 19.2 and 19.3 are entered in the fictitious picture of FIG. 3b. In the example, it holds that the lines that are entered in the fictitious picture are neighboring lines in the picture from which they originate, while these lines are also neighboring lines in the fictitious picture, with an order of the lines entered in the fictitious picture being the same as the order of these lines in the picture 19.i from which they originate. Thereupon the steps mentioned are repetitively carried out for consecutive groups, while the picture lines that are entered are each time selected within the picture from which these picture lines originate, while the selected picture lines are a number of consecutive picture lines of which a first picture line 30 each time lies at one and the same predetermined position within the picture from which it originates and of which the other lines lie within the picture from which they originate at a distance from the first picture line 30 in the walk-through direction. Furthermore, it holds in this example that the lines that are entered in the fictitious picture and originate from a particular group, are entered such that one of these lines lies next to a line that was previously entered last and originates from another picture. In this example, the line 30 of picture 19.2 is entered, for example, next to the line 35 from the picture 19.1. Accordingly, the same will apply to lines that are entered from other pictures in the fictitious picture according to FIG. 3b.

If, however, it holds for a group, for example for the group of pictures consisting of the pictures 19.3 and 19.4, that the picture is moving counter to the walk-through direction, a number of lines entered last next to each other is removed from the fictitious picture. All this is entirely analogous to what has been discussed in relation to the example according to FIG. 3a. Here too, it holds that the number of lines that is removed is a function of the determined measure for the speed counter to the walk-through direction. It holds here, moreover, that the number of lines that is removed increases when the measure for the speed counter to the walk-through direction increases when the measure for the speed counter to the walk-through direction increases. If it appeared, for example, that the measure for the speed is one for the group of pictures consisting of the pictures 19.3 and 19.4, while moreover this speed is directed counter to the walk-through direction, the last entered line of FIG. 3b is deleted. In this example, it would concern the line 35 originating from the picture 19.2. If the measure for the speed that is determined for the group 19.2 and 19.3 were two, and counter to the walk-through direction, the two last entered lines would be deleted from the fictitious picture 28. In this example, these would be the lines 34 and 35, originating from the picture 19.2. As discussed above, the fictitious picture is expanded, or shortened again, by each time repetitively carrying out the respective steps for consecutively obtained groups 19.1 and 19.2, 19.2 and 19.3, 19.3 and 19.4, etc. The further processing of the fictitious picture according to FIG. 3b can be carried out in a manner entirely analogous to that as discussed above for the further processing of the fictitious picture according to FIG. 3a. In the example of FIG. 3b, the number of lines that are entered from a picture into the fictitious picture involve neighboring lines. However, this is not requisite. It would also be possible, for example, that each time only even lines are entered. If, for example, the measure for the speed is i, the lines 30, 32, 34, ... 30.2i could be entered from the respective picture of a group for which it holds that the measure for the speed equals i. Such variants are understood to fall within the framework of the invention. For the sake of completeness, it is noted that the embodiments of the fictitious pictures according to FIGS. 4 and 5 may be obtained in a same manner based on FIG. 3b as has been discussed on the basis of FIG. 3a. This applies equally to the variants according to FIGS. 6 and 7 that have been discussed on the basis of FIG. 3a. These variants can also be applied on the basis of the fictitious picture according to FIG. 3b.

The invention is not in any way limited to the above-outlined embodiments. Thus, it is also possible that a group a comprises, for example, three pictures 19.i−1, 19i and 19.i+1. Based on these three pictures, per group, again a measure for the speed and a direction of the speed may be determined. It may then be chosen, for example, on the basis of the measure, again to enter a number of same lines next to each other in the fictitious picture as discussed with reference to FIG. 3a or to enter a number of consecutive lines as discussed with reference to FIG. 3b. This may, for example, each time be the line or lines from the first picture 19.i−1 of the group i. Also, of course, it may each time be a line or lines from the second picture 19.i of the group i or be a line and lines from the third picture 19.i+1 of the i group that are entered. In this example, group i comprises the pictures 19.i−1, 19i and 19.i+1 and group i+1 comprises the pictures 19.i, 19.i+1 and 19.i+2 and so two groups i and i+1 obtained one after the other have two common pictures. It is hence possible that successively obtained groups partly overlap each other. It is also possible that the pictures of successively obtained groups adjoin each other. For example, the last picture of a particular group may be the picture 19.5 while the first picture of a next group is the picture 19.6. Of course, the group division may also be such, when each group comprises e.g. three pictures, that a last picture of a first group is the same picture as a first picture of a next group. Also, the last two pictures of a first group may be equal to the two successive pictures of a next group as discussed above for a group of each time three pictures. Such variants are each understood to fall within the framework of the invention. Also, the groups can comprise four or more pictures. In this example, the pictures are obtained with a single camera. Naturally, it is also possible to obtain a picture with the aid of two cameras. Also, it holds that in this example the camera is hangs stationarily. It is also conceivable that a camera moves, in which case, however, care needs to be taken that when a line from a picture is selected for entry in the fictitious picture, this line each time needs to be in the same position within the predefined place. The position of the line to be entered in the fictitious picture, within the picture from which this line is obtained can then vary with the movement of the camera. In the example outlined above, however, the camera was stationary, with a central line 30 of the picture coinciding with approximately the center of the predetermined position. This, then, is the line that in the example of FIG. 3a is repeatedly entered, or in the example of FIG. 3b is the first line of the consecutive lines that are entered. Also, it holds in this example that the picture lines are perpendicular to the walk-through direction P.

It is also conceivable, however, that the picture lines include an angle different from zero and ninety degrees with the walk-through direction P. In that case, too, a walk-through speed of an animal in the direction of the arrow P can be determined, and the number of lines that is entered in the fictitious picture, or is removed from the fictitious picture, can depend on the speed of the animal and the direction in which the animal is moving. In that case, however, the entered lines 30' in FIG. 3a and the entered lines 30'-35' in FIG. 3b will include a same angle with the arrow P as the picture lines 30', 31' in FIG. 1a with respect to the arrow P. If this angle is, for example, forty-five degrees in FIG. 1a, this angle will also be forty-five degrees in the fictitious picture according to FIG. 3a and FIG. 3b. In FIG. 1a such lines 30', 31' are represented in broken lines and in FIG. 3a two of such lines 30' are shown while in FIG. 3b the lines 30'-33' of a first picture 19.1 (in this figure, for simplicity, only the line 30' is shown) are shown and the lines 30'-31' from a second picture 19.2 (in this figure, for simplicity, only the line 30' is shown). Such variants are each understood to fall within the framework of the invention.

The invention claimed is:

1. A method for detecting, in particular counting, animals that pass a predefined place in a walk-through direction with the aid of at least a camera, wherein the camera successively records pictures of the defined place and wherein the camera generates signals that represent these pictures and supplies these signals to signal processing means for further processing, characterized in that the picture lines of the successively obtained pictures include an angle different from zero degrees with the walk-through direction, wherein a multiplicity of the recorded pictures are processed with the aid of the signal processing means, comprising:
  a. in a group of at least two successively obtained pictures, within these pictures at least one pattern is searched for that occurs in each of these pictures, and further at least one difference between the positions of a found pattern within the respective at least two successively obtained pictures of the group is determined if such a pattern is found and a difference between the positions of the pattern within the successively obtained pictures is present;
  b. if in step a. within at least two pictures of the group the difference in the positions has been determined, from this difference a measure for the speed of the respective pattern in the walk-through direction is determined if the pattern moves in the walk-through direction and a measure for the speed of the respective pattern counter to the walk-through direction is determined if the pattern moves counter to the walk-through direction;
  c. if the pattern moves in the walk-through direction, a number of picture lines from one of the pictures of the group are entered next to each other in a fictitious picture, wherein the number of picture lines from the one picture of the group that is entered in the fictitious picture is a function of the determined measure of the speed in the walk-through direction, wherein the picture lines that are entered in the fictitious picture are selected in a predetermined manner within the picture from which these picture lines originate, wherein the number of picture lines that is entered increases when the measure for the speed in the walk-through direction increases, and if the pattern moves counter to the walk-through direction, a number of picture lines last entered next to each other is removed from the fictitious picture, wherein the number of picture lines that is removed is a function of the measure of the speed counter to the walk-through direction, wherein the number of picture lines that is removed increases when the measure for the speed counter to the walk-through direction increases;
  d. the fictitious picture is further built up by repetitively carrying out the steps a, b and c successively for consecutively obtained groups, wherein the picture lines that are entered in the fictitious picture are each time selected in the same predetermined manner within the picture from which these picture lines originate, wherein, each time for two consecutively obtained groups, it holds that a last recorded picture of a last obtained group of two consecutive groups was obtained later than a last recorded picture of the previously obtained group of two consecutively obtained groups;
  e. in the fictitious picture that has been obtained after carrying out step d, the individual animals are detected and in particular the number of animals is counted.

2. The method according to claim 1, characterized in that in step a. within the at least two pictures of the group, at least one pattern is searched for that occurs in each of the pictures and thereupon within each picture of the group a position of the found pattern is determined for determining the difference between the positions of the found pattern within the at least two successively obtained pictures, wherein only the positions of patterns are determined that correspond to each other and that take up different positions in different pictures.

3. The method according to claim 1, characterized in that in step a. within the at least two pictures of the group at least one pattern is searched for that occurs in each of the pictures and thereupon within each picture of the group a position of the found pattern is determined for determining the difference between the positions of the found pattern within the at least two successively obtained pictures, wherein only patterns are searched for that correspond to at least one predetermined pattern that corresponds to a predetermined part of the animal.

4. The method according to claim 3, characterized in that in step a. in a group of at least two consecutive pictures within each picture a position of a predetermined part of an animal is searched for and where possible determined; and that in step b., if in step a. within at least two pictures of the group the position of the predetermined part of the animal has been determined, from these positions a measure for the speed of the respective animal in the walk-through direction is determined if the animal moves in the walk-through direction and a measure for the speed of the respective animal counter to the walk-through direction is determined if the animal moves counter to the walk-through direction.

5. The method according to claim 1, characterized in that in step a. in a first picture of the at least two pictures of the group at a predetermined position within the first picture a first partial picture is determined that consists of a part of the first picture, wherein thereupon in a second picture of the group a second partial picture is searched for that comprises a pattern that corresponds at least substantially to the pattern of the first partial picture and wherein thereupon the difference between the predetermined position of the first partial picture within the first picture and the position of the second partial picture within the second picture is determined to obtain said difference in positions.

6. The method according to claim 5, characterized in that dimensions of the first partial picture are predetermined and are smaller than the dimensions of the first picture, more particularly, a factor x smaller, where x is greater than or equal to 2, 4, 16 or 25.

7. The method according to claim 5, characterized in that dimensions of the second partial picture are equal to dimensions of the first partial picture.

8. The method according to claim 5, characterized in that position of a partial picture within a picture may be understood to mean the position of a center of gravity of the partial picture within the picture.

9. The method according to claim 5, characterized in that the predetermined position of the first partial picture lies approximately in the center of the first picture.

10. The method according to claim 1, characterized in that a pattern is characterized by the place of pixels of the pattern with respect to each other and possibly also by the color and/or intensity of the pixels.

11. The method according to claim 1, characterized in that in step c an order in which the picture lines are entered in the fictitious picture corresponds to an order of these picture lines within the picture from which these picture lines originate.

12. The method according to claim 1, characterized in that in carrying out step c. the picture lines that are entered in the fictitious picture are each time so selected within the picture from which these picture lines originate that the selected picture lines are a number of consecutive picture lines of which a first picture line each time lies at one and the same predetermined position within the picture from which it originates and of which the other lines lie within the picture from which they originate at a distance from the first picture line in the walk-through direction.

13. The method according to claim 11, characterized in that the lines that in step c are entered in the fictitious picture are neighboring lines in the picture from which they originate, while these lines are also neighboring lines in the fictitious picture, with the order of the lines entered in the fictitious picture being the same as the order of these lines in the picture from which they originate.

14. The method according to claim 11, characterized in that in step d the fictitious picture is further built up by repetitively carrying out the steps a, b and c successively for consecutively obtained groups, wherein the picture lines that are entered are each time so selected within the picture from which these picture lines originate that the selected picture lines are a number of consecutive picture lines of which a first picture line each time lies at one and the same predetermined position within the picture from which it originates and of which the other lines lie within the picture from which they originate at a distance from the first picture line in the walk-through direction.

15. The method according to claim 1, characterized in that in step c if the pattern moves in the walk-through direction, in the fictitious picture a number of times one picture line from one of the pictures from the group are successively entered next to each other, wherein the picture line that is entered a number of times in the fictitious picture is a picture line with a predetermined position within the picture from which the picture line originates.

16. The method according to claim 15, characterized in that in step d the fictitious picture is further built up by repetitively carrying out the steps a, b and c successively for consecutively obtained groups, wherein the picture lines that are entered in the fictitious picture each time have a same predetermined position within the recorded pictures from which these picture lines originate.

17. The method according to claim 1, characterized in that the lines that are entered in step c are entered such that one of these lines lies next to a line that has been entered in a previously carried-out step c.

18. The method according to claim 1, characterized in that the picture lines of the successively obtained pictures extend at least substantially transverse to the walk-through direction, more particularly, that these picture lines are directed at least substantially perpendicular to the walk-through direction.

19. The method according to claim 1, characterized in that the picture lines are directed at least substantially horizontally.

20. The method according to claim 1, characterized in that each group consists of two successively obtained pictures, wherein in step c each time picture lines from the first recorded picture from a group are entered in the fictitious picture.

21. The method according to claim 1, characterized in that for each picture line that is entered in the fictitious picture, it holds that it lies approximately in the center of the picture from which it originates.

22. The method according to claim 1, characterized in that, each time for two consecutive groups, it holds that a last obtained picture of a first obtained group of the two consecutive groups is equal to a first obtained picture of the next obtained group of the two consecutive groups.

23. The method according to claim 1, characterized in that, each time for two consecutive groups, it holds that a last obtained picture of a first obtained group of the two consecutive groups was obtained previously to a first obtained picture of the next obtained group of the two consecutive groups.

24. The method according to claim 1, characterized in that in step e. on the basis of the length of the fictitious picture the number of animals is determined or estimated.

25. The method according to claim 1, characterized in that in step e. prior to the counting of the animals in the fictitious picture from each picture line of the fictitious picture a picture line is subtracted that corresponds to at least one of the pictures in which no animal is present and within that picture is a line at the predetermined position a line at the predetermined position within a picture wherein it is obtained from a picture when in the picture no animal is present.

26. The method according to claim 25, characterized in that in step e. prior to the counting of the animals the pictures of the animals in the fictitious picture are provided with a uniform color.

27. The method according to claim 25, characterized in that for counting the animals the number of paunches of the animals in the fictitious picture is counted.

28. The method according to claim 27, characterized in that the picture of a standard paunch is correlated with the fictitious picture for obtaining correlation factors as a function of a position in the fictitious picture in the walk-through direction.

29. The method according to claim 28, characterized in that on the basis of the correlation factors as a function of the position in the fictitious picture the number of animals is counted.

30. The method according to claim 1, characterized in that the video camera is situated above the predefined place.

31. The method according to claim 30, characterized in that the video camera records the pictures of the predefined place in vertical direction downwards.

32. A system for detecting, in particular counting, animals that pass a predefined place in a walk-through direction comprising:
a camera and signal processing means,
wherein the camera successively records pictures of a defined place and wherein the camera generates signals that represent these pictures and supplies these signals to the signal processing means for further processing, characterized in that picture lines of the successively obtained pictures include an angle different from zero degrees with the walk-through direction, wherein a multiplicity of the recorded pictures are processed as follows by the signal processing means:

a. in a group of at least two successively obtained pictures, within these pictures at least one pattern is searched for that occurs in each of these pictures, and further at least one difference between the positions of a found pattern within the respective at least two successively obtained pictures of the group is determined if such a pattern is found and a difference between the positions of the pattern within the successively obtained pictures is present;

b. if in step a. within at least two pictures of the group the difference in the positions has been determined, from this difference a measure for the speed of the respective pattern in the walk-through direction is determined if the pattern moves in the walk-through direction and a measure for the speed of the respective pattern counter to the walk-through direction is determined if the pattern moves counter to the walk-through direction;

c. if the pattern moves in the walk-through direction, a number of picture lines from one of the pictures of the group are entered next to each other in a fictitious picture, wherein the number of picture lines from the one picture of the group that is entered in the fictitious picture is a function of the determined measure of the speed in the walk-through direction, wherein the picture lines that are entered in the fictitious picture are selected in a predetermined manner within the picture from which these picture lines originate, wherein the number of picture lines that is entered increases when the measure for the speed in the walk-through direction increases, and if the pattern moves counter to the walk-through direction, a number of picture lines last entered next to each other is removed from the fictitious picture, wherein the number of picture lines that is removed is a function of the measure of the speed counter to the walk-through direction, wherein the number of picture lines that is removed increases when the measure for the speed counter to the walk-through direction increases;

d. the fictitious picture is further built up by repetitively carrying out the steps a, b and c successively for consecutively obtained groups, wherein the picture lines that are entered in the fictitious picture are each time selected in the same predetermined manner within the picture from which these picture lines originate, wherein, each time for two consecutively obtained groups, it holds that a last recorded picture of a last obtained group of two consecutive groups was obtained later than a last recorded picture of the previously obtained group of two consecutively obtained groups;

e. in the fictitious picture that has been obtained after carrying out step d, the individual animals are detected and in particular the number of animals is counted.

* * * * *